US006886884B2

(12) United States Patent
Bull et al.

(10) Patent No.: US 6,886,884 B2
(45) Date of Patent: May 3, 2005

(54) REDUCING LOCALIZED DEFLECTION IN THE BODY OF A BODY-ON-FRAME VEHICLE

(75) Inventors: William A. Bull, Rochester Hills, MI (US); Kevin M. Waters, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/623,945

(22) Filed: Jul. 21, 2003

(65) Prior Publication Data

US 2005/0017544 A1 Jan. 27, 2005

(51) Int. Cl.[7] .............................................. B62D 25/20
(52) U.S. Cl. ................. 296/187.08; 296/204; 296/205; 296/35.2
(58) Field of Search ....................... 296/187.01, 187.03, 296/187.08, 193.07, 203.01, 204, 205, 35.1, 35.2

(56) References Cited

U.S. PATENT DOCUMENTS

| | | | | | |
|---|---|---|---|---|---|
| 2,882,090 | A | * | 4/1959 | Sewelin | 296/35.1 |
| 3,177,032 | A | * | 4/1965 | Jaskowiak | 296/35.1 |
| 3,572,814 | A | * | 3/1971 | Ravenel | 296/35.1 |
| 4,311,204 | A | * | 1/1982 | Shupert | 180/54.1 |
| 5,219,439 | A | * | 6/1993 | Moore et al. | 296/35.1 |
| 5,700,049 | A | * | 12/1997 | Shibata | 296/203.03 |
| 5,897,139 | A | * | 4/1999 | Aloe et al. | 280/781 |
| 6,045,174 | A | * | 4/2000 | Brancaleone et al. | 296/63 |
| 6,375,247 | B1 | * | 4/2002 | Volz et al. | 296/66 |
| 6,422,631 | B1 | * | 7/2002 | Schmidt et al. | 296/68.1 |
| 6,692,052 | B1 | * | 2/2004 | Sutton et al. | 296/35.2 |
| 2001/0002761 | A1 | * | 6/2001 | Tsuruta et al. | 296/189 |
| 2003/0184124 | A1 | * | 10/2003 | Yamaguchi | 296/204 |

* cited by examiner

Primary Examiner—Patricia L. Engle
(74) Attorney, Agent, or Firm—Ralph E. Smith

(57) ABSTRACT

An apparatus and method for reducing localized deflection in the body of a body-on-frame vehicle are provided through use of a vehicle body having a localized portion thereof that deflects locally and contacts the frame, for resisting further localized deflection of the localized area of the body when the operating load is applied to the localized area of the body. The localized area of the body forms a localized gap between the frame and the localized area of the body, when the body is mounted on the frame in a spaced relationship thereto, that closes and allows the localized area of the body to contact the frame. The apparatus exceeds the requirements of FMVSS 225 for limiting maximum allowable deflection under simulated operating loads applied through a test fixture anchored to child restraint seat anchor points of a seating structure attached to the vehicle body.

10 Claims, 7 Drawing Sheets

REDUCING LOCALIZED DEFLECTION IN THE BODY OF A BODY-ON-FRAME VEHICLE

TECHNICAL FIELD OF THE INVENTION

This invention relates to vehicles having a body mounted on a frame, and more particularly to vehicles having bodies subject to localized deflection from operating loads applied to the body by passenger seating structures, or other load bearing structures affixed to the body.

BACKGROUND OF THE INVENTION

For many years, vehicles such as automobiles, light trucks, vans, and recreation vehicles have utilized a construction method known in the industry as body-on-frame construction. With body-on-frame construction, a vehicle body is mounted on a vehicle frame by resilient isolators. Typically, the body has been spaced away from the frame by a fairly wide gap of 25 mm or more, to provide a built in allowance for dimensional variations in the frame and the body, rubber compression of the isolators, and other manufacturing concerns, so that the body will not contact the frame directly under either static or operating loads. It has also been common practice to route components such as brake lines and wiring harnesses through the gap between the body and frame, so that they will be protected from damage.

FIG. 1 shows several components of a prior body-on-frame apparatus 100, to illustrate the manner in which the body 112, as represented by a cross member 113 of the body 112, is mounted in a spaced relationship to the frame 114, to form a gap 118 having a vertical dimension designated as D1. As stated above, in the past, the gap 118 between the body 112 and frame 114 has had a dimension D1 that is fairly wide, on the order of 25 mm or more, so that the body 112 will never contact the frame 114 during operation of the vehicle, as a result of either general movement of the entire body 112 with respect to the frame 114, or as a result of localized deflection of a portion of the body 112 due to localized loads applied to the body 112 by load bearing structures, such as the passenger seating structure 111 shown in FIG. 1.

The National Highway Traffic Safety Administration, of the United States Department of Transportation, has promulgated regulations FMVSS 213 and FMVSS 225, relating to the design and testing of Child Restraint Anchorage Systems in vehicles, which limit the total amount of localized deflection of body 112 and seating structures 111 attached to the body 112 that is allowable under specified loading conditions, which are selected to emulate the operating load imposed on the body 112 of a vehicle during a collision, by a child restraint apparatus holding a child while anchored to a seating structure 111 of the vehicle.

Through the years that FMVSS 213 and FMVSS 225 have been in force, the level of the operating load applied during testing has been increased periodically, and the amount of deflection that is allowable has been decreased. These changes in the regulations have required that portions of the seating structure 111, and components of the vehicle body 112 such as the crossmember 113 be made stronger and more resistant to bending under the forces exerted by the operating loads specified in FMVSS 213 and 225. Generally this has required the addition of reinforcing components, such as doublers, or increasing the thickness of the material used in the components of the seating structure 111, the crossmember 113, and other parts of the vehicle body 12. Adding these components and increasing the material thickness undesirably increases the cost, weight and complexity of the body-on-frame apparatus of the vehicle.

For vehicles entering service after Sep. 1 of 2004, the operating loads required by FMVSS 225 have once again been increased to be 50 percent higher than the loads previously required. It is highly desirable that an apparatus and method be provided for handling these additional loads without further increasing the cost, weight, and complexity by resorting to the prior practice of adding yet more reinforcing components and/or increasing the material thickness of prior components. It is also highly desirable that an apparatus and method be provided that will handle the new, higher loads, and allow a reduction in the cost, weight and complexity of the body-on-frame apparatus.

SUMMARY OF THE INVENTION

Our invention provides an improved apparatus and method, meeting the requirements discussed above, through use of a vehicle body having a localized portion thereof that deflects locally and contacts the frame, for resisting further localized deflection of the localized area of the body when the operating load is applied to the localized area of the body.

One form of our invention provides a vehicle body apparatus adapted for attachment to a vehicle frame in a spaced relationship thereto, with the vehicle body apparatus including a vehicle body having a localized area that is deflectable by an operating load applied to the localized area when the body is attached to the frame in a spaced relationship thereto. The localized area of the body forms a localized gap between the frame and the localized area of the body, when the body is mounted on the frame in a spaced relationship thereto, that closes and allows the localized area of the body to contact the frame for resisting further localized deflection of the localized area of the body when the operating load is applied to the localized area of the body. The body may be configured such that the gap is closed, and the localized area of the body contacts the frame, when a predetermined amount of localized load is applied to the localized area of the body.

The vehicle body apparatus may include a load bearing structure operatively attached to the localized area of the body for applying the operating load to the localized area. The load bearing structure may include a passenger seating structure. The seating structure may include anchorages for a child restraint apparatus, and the operating load may be applied to the seating structure by a load applying structure attached to the anchorages for the child restraint apparatus.

The frame and body may be configured such that the frame includes an upper surface thereof, adapted for contact by the localized area of the body, and the body includes a lower surface thereof defining the localized area of the body. The body may include a crossmember defining the lower surface and localized area of the body.

Our invention may also take the form of a body-on-frame apparatus having a vehicle frame adapted for receiving a vehicle body as described above, with a body as described above mounted on the frame.

Our invention may further take the form of a method for constructing a body-on-frame vehicle, by fabricating a vehicle body including a localized area that is deflectable by an operating load applied to the localized area, when the body is attached to a frame in a spaced relationship thereto, and attaching the vehicle body to a frame, in such a manner that the localized area of the body forms a localized gap, between the frame and the localized area of the body, that closes and allows the localized area of the body to contact the frame for resisting further localized deflection of the localized area of the body, when the operating load is applied to the localized area of the body while the body mounted on the frame in the spaced relationship thereto.

The foregoing and other features and advantages of our invention will become further apparent from the following detailed description of exemplary embodiments, read in conjunction with the accompanying drawings. The detailed description and drawings are merely illustrative of our invention rather than limiting, the scope of the invention being defined by the appended claims and equivalents thereof.

DETAILED DESCRIPTION

Figure 2:
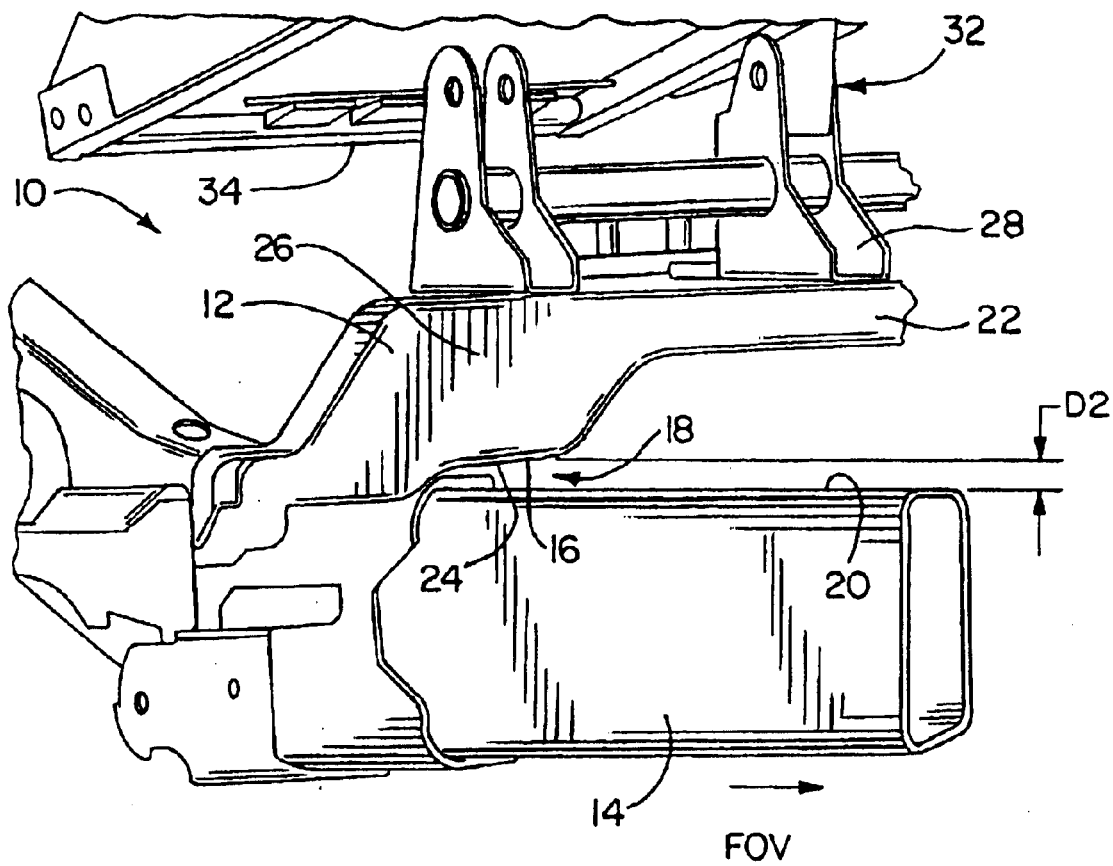
FIGS. 2 and 3 are front and rear perspective views, respectively, of an exemplary embodiment of a body-on-frame apparatus, according to our invention, for a vehicle.
Figure 3:
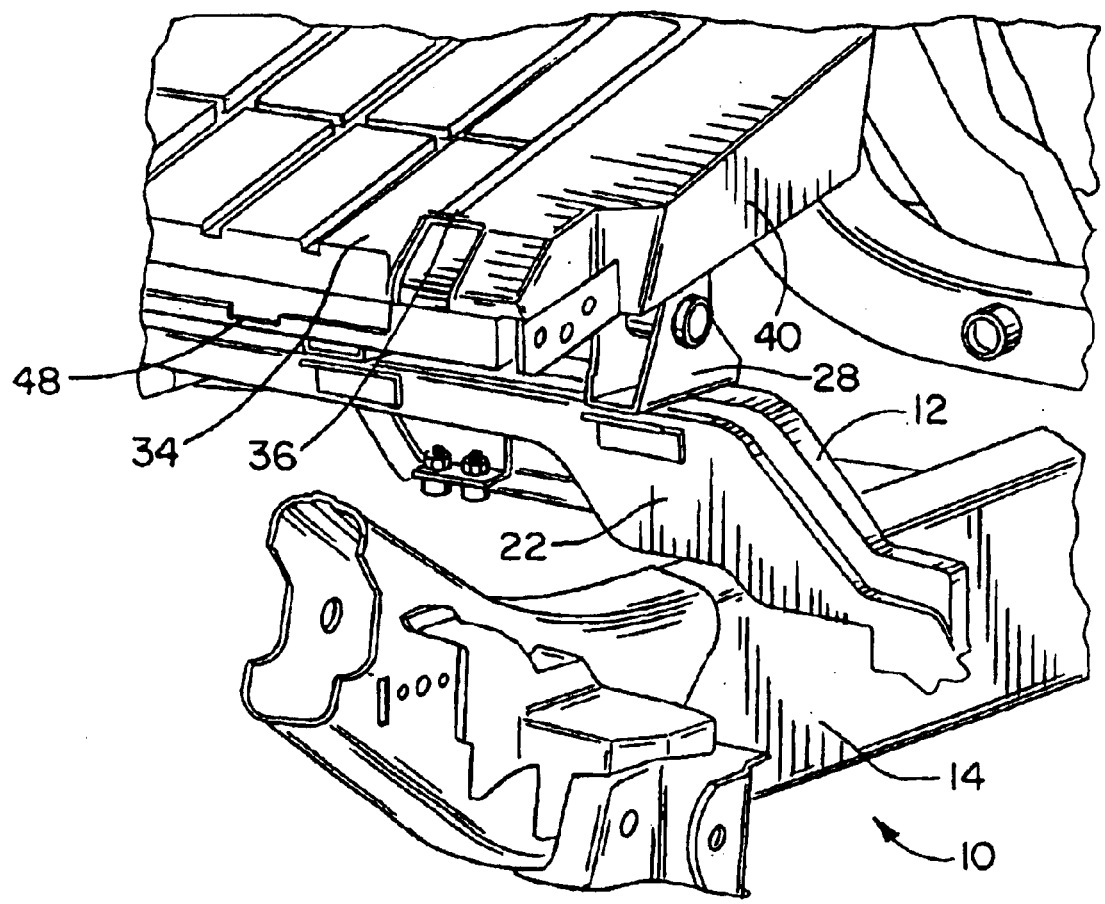
Figure 4:
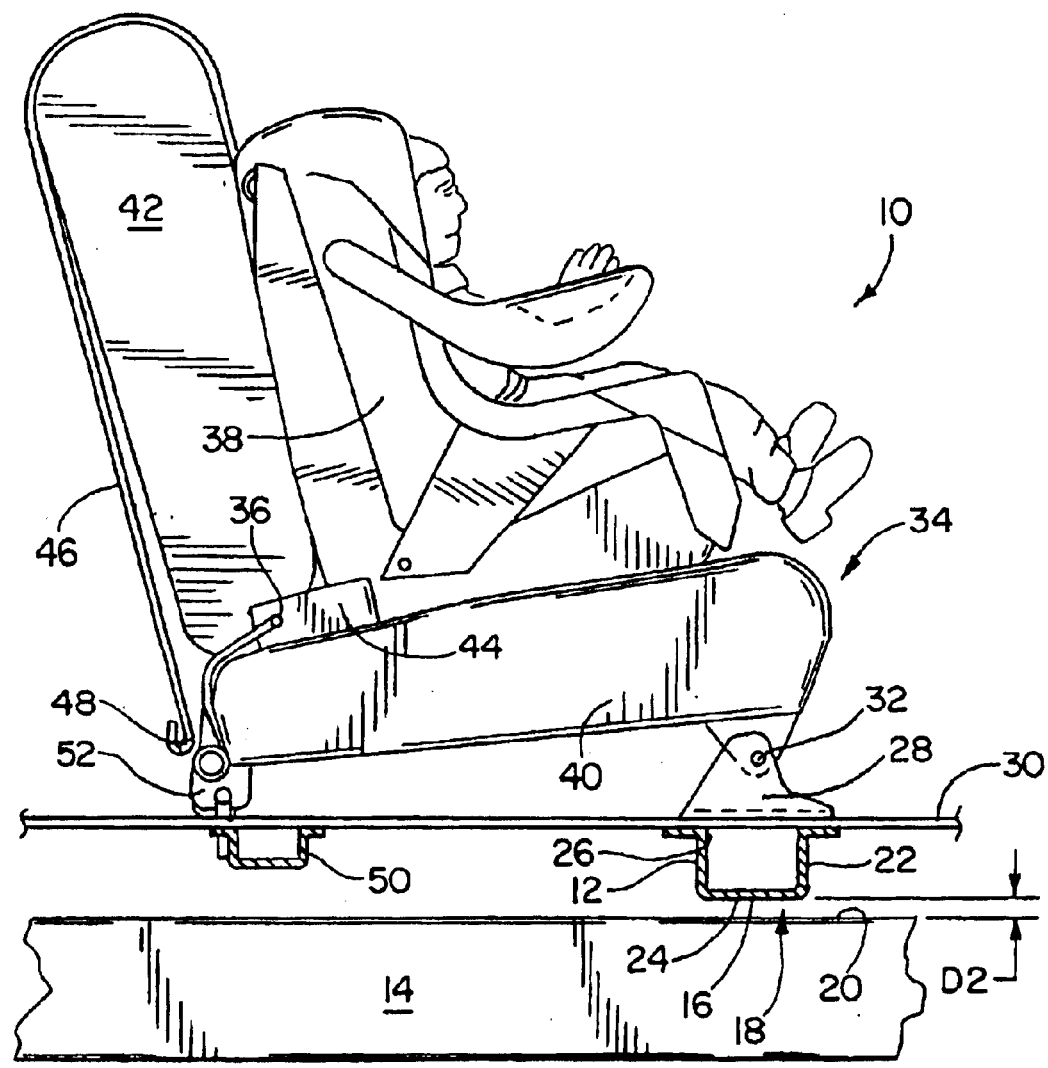
FIG. 4 is cross-sectional view of the exemplary embodiment of FIGS. 2 and 3, showing additional aspects of our invention.

FIGS. 2–4 collectively show various aspects of an exemplary embodiment of a body-on-frame apparatus 10, according to our invention. The body-on-frame apparatus 10 includes a vehicle frame 14 adapted for receiving a vehicle body 12, and a vehicle body 12 mounted on the frame 14 in a spaced relationship thereto, and including a localized area 16 that is deflectable when an operating load is applied to the localized area 16 of the body 12.

The localized area 16 of the body 12 forms a localized gap 18 having a vertical dimension D2, between the frame 14 and the localized area 16 of the body 12, when the body 12 is mounted on the frame 14 in a spaced relationship to the frame 14. As will be readily seen, by comparing FIGS. 1 and 2, the vertical gap 18 of the exemplary embodiment of our invention has a vertical dimension D2 that is significantly smaller than the vertical dimension D1 of the gap 118 in the prior body-on-frame apparatus 100 shown in FIG. 1. The body 12 of the exemplary embodiment is configured such that the gap 18 closes and allows the localized area 16 of the body 12 to contact the frame 14 for resisting further localized deflection of the localized area 16 of the body 12, when the operating load of a predetermined amount is applied to the localized area 16 of the body 12.

The frame 14 includes an upper surface 20 thereof adapted for contact by the localized area 16 of the body 12. The body 12 includes a crossmember 22 having a pedestal portion 26, at each end thereof, which defines a lower surface 24 of the body 12 that includes the localized area 16 of the body 12. The crossmember 22 is attached along an upper surface thereof to a floor pan 30 of the body 12. The pedestal 26 is configured, and positioned relative to the frame 14, in such a manner that the pedestal 26 is loaded in compression between the floor pan 30 and the upper surface 20 of the frame 14 when the gap 18 is closed and the localized area 16 of the body 12 is in contact with the frame 14.

The body-on-frame apparatus 10 includes a load bearing structure, in the form of a seat attachment bracket 28 attached to the floor pan 30, for receiving a front attachment point 32 of a seating structure 34. As shown in FIGS. 3 and 4, the seating structure 34 includes anchorage hooks 36 adapted for latching engagement with anchor bars 44 extending from the lower rear corner of a child restraint seat 38, sitting on a cushion 40 and against the seat back 42 of the seating structure 34. The seating structure 34 also includes a tether attachment bar 48 for connection to a tether strap 46 extending over the top of the seat back 42 from the top of the child restraint seat 38.

The seating structure 34 of the exemplary embodiment, shown in FIG. 4, is a rear, or second row seat of a vehicle such as a sport utility vehicle (SUV). The body 12 of the exemplary embodiment of the body-on-frame apparatus 10 includes a C-pillar crossmember 50, and a rear seat support bracket 52 for attaching the rear of the seating structure 34 to the body 12.

When a large operating load is applied to the seating structure 34 of the exemplary embodiment, in circumstances where a child is secured in the child restraint seat 38 during a collision, the forces generated by inertia are transferred through the seating structure 34 to the body 12, and will be absorbed at first by bending of the seating structure 34, the crossmember 22, and other components of the body 12. If the operating load is high enough, the localized area 16 on the lower surface 24 of the crossmember 22 will close the gap 18 and bear against the top surface 20 of the frame 14. Further loading will then be resisted by the pedestal 26 of the crossmember 22, with very little additional local deflection of the body 12, due to the high compressive, or crush strength of the pedestal 26.

Figure 1:
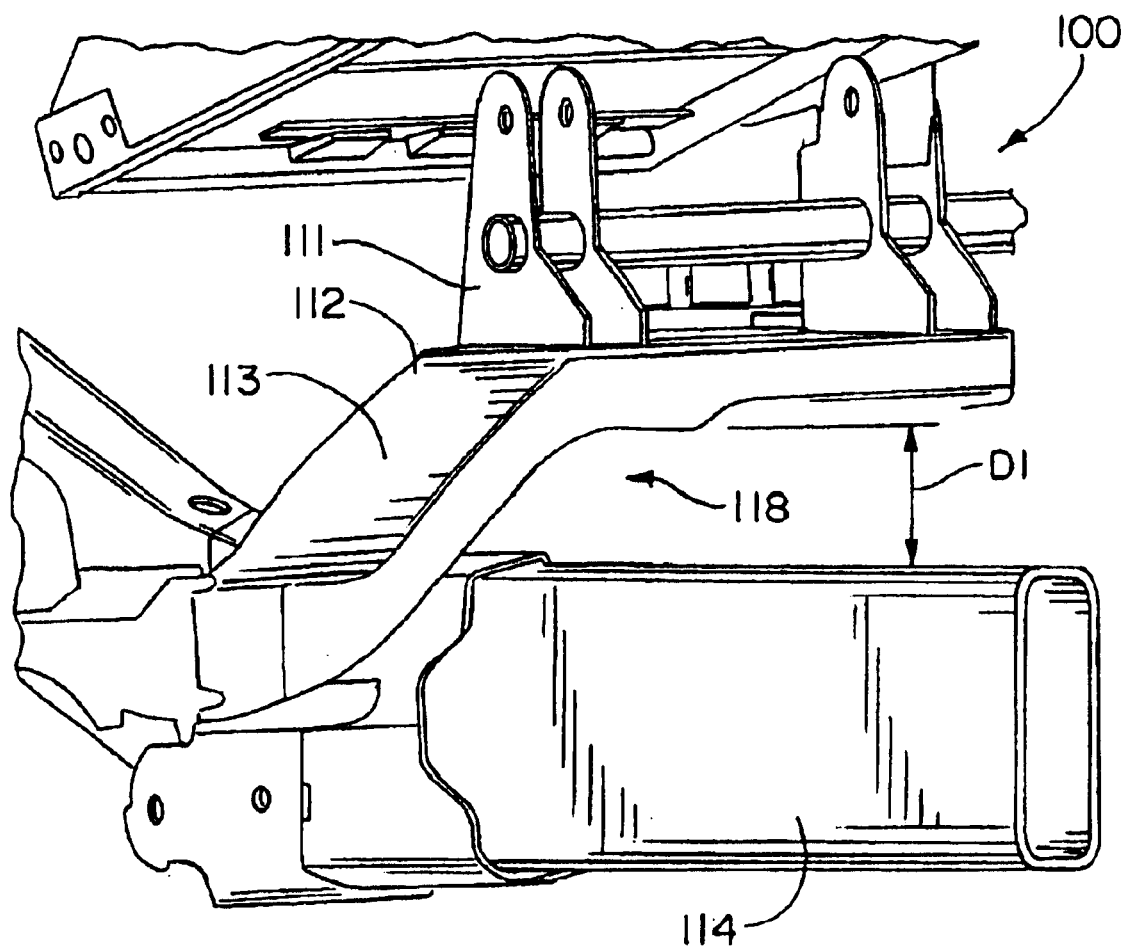
FIG. 1 is perspective representation of a portion of a prior body-on-frame apparatus for a vehicle.

Components such as the seating structure 34 and crossmember 22 can thus be made of material that is considerably thinner than would have to be used if the operating force needed to be entirely resisted by bending of the seating structure 34, the crossmember 22 and other components of the body 12 in the same manner as prior body-on-frame apparatuses 100, such as the one shown in FIG. 1.

Test Results

Figure 5:
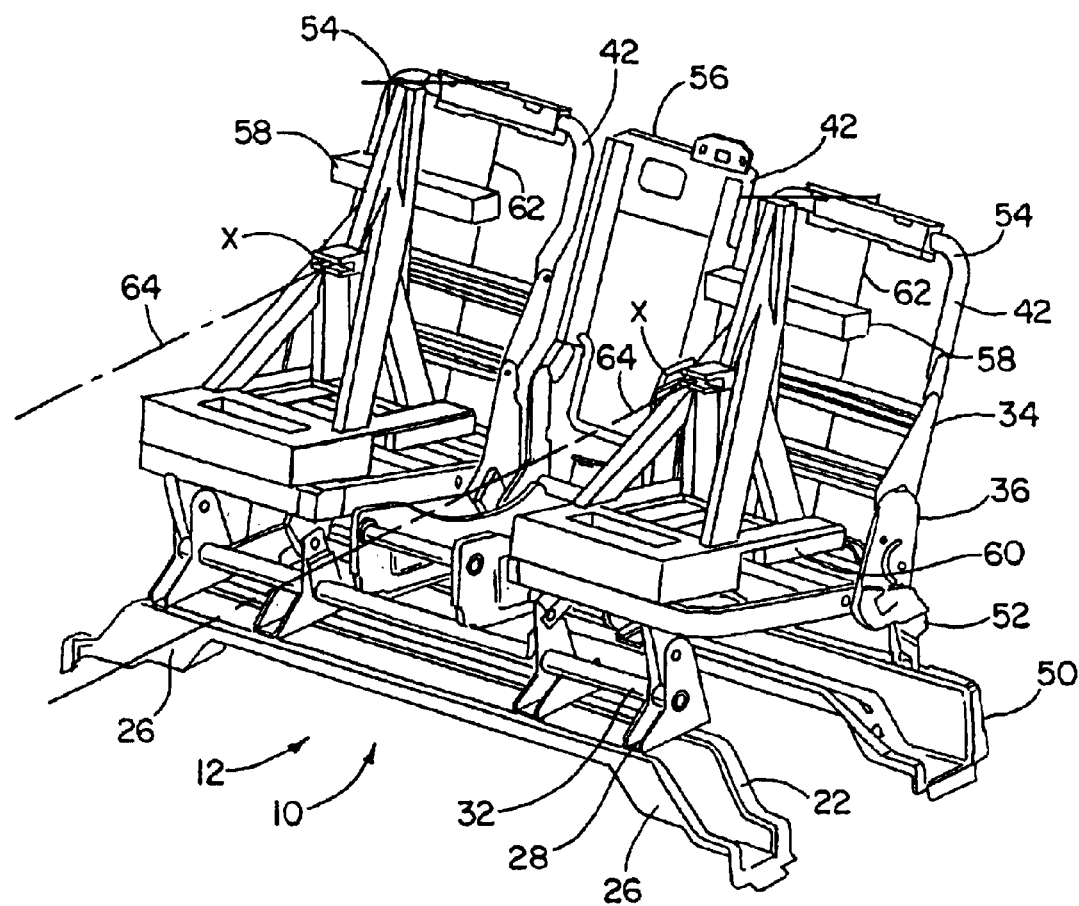
FIGS. 5 and 6 are perspective partial views of test setups for testing an embodiment of our invention according the provisions of United States government regulations FMVSS 213 and FMVSS 225.
Figure 6:
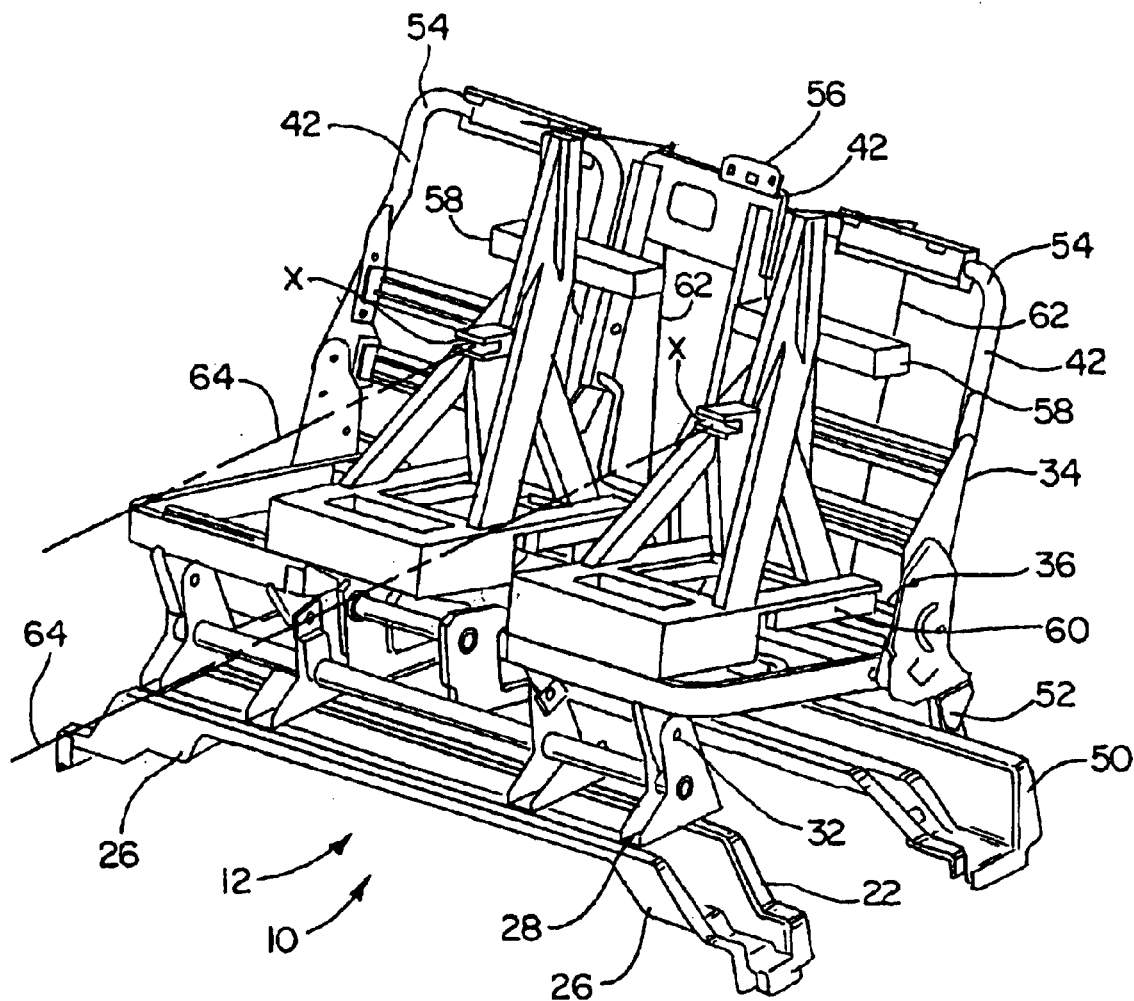

A body-and-frame apparatus 10 of the type described above in relation to the exemplary embodiment was tested in accordance with the test procedures laid out in FMVSS 213 and FMVSS 225. Salient components of the apparatus as tested, and the test setup, are illustrated in FIGS. 5 and 6. Although the actual testing was done on a completed vehicle, most of the vehicle, the frame 14, and components of the body-and frame apparatus 10 such as the cushion 40 and seatback 42, the floor pan 30 and most of the body 12 are omitted in FIGS. 5 and 6 so that the salient components, for purposes of disclosing our invention, can be viewed more clearly.

The seating apparatus 34 of the test apparatus represents a rear seat in a sport utility vehicle (SUV). The seating structure 34 includes a pair of 40% seats 54 flanking a central 20% seat 56, the names indicating roughly the percentage of the total width of the seating structure 34 spanned by each seat 54, 56, 54. The seat backs 42 (only the frames of which are shown) of both 40% seats 54 and the central 20% seat 56 may be independently folded forward onto their respective cushions 40. The folded 40% seats 54 may also be independently unlatched from the rear seat support 52 so that the 40% seats 54 may be pivoted about the attachment point 32 of the front seat support 28, and stowed against the back side of the front seats (not shown). The cushion portion 40 of the central 20% seat 56 is fixed, such that the seat 56 may be folded but cannot be pivoted forward against the back of the front seats.

Figure 7:
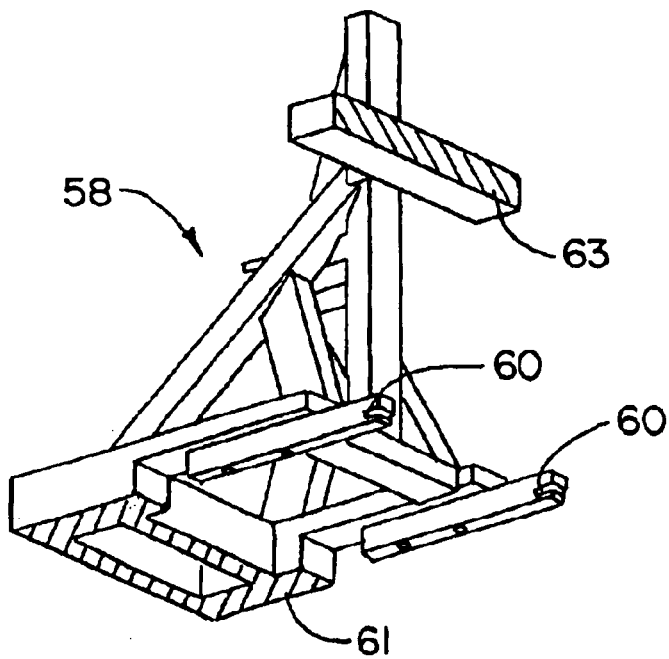
FIGS. 7 and 8 are a perspective view and a side view, respectively, of a test fixture, as specified by FMVSS 225, used in the test setups of FIGS. 5 and 6.
Figure 8:
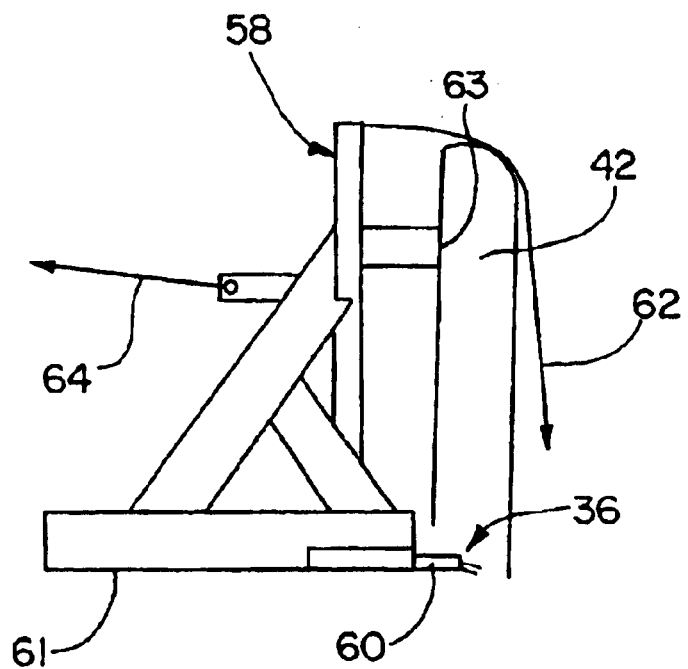

In accordance with the provisions of FMVSS 213 and 225, a test fixture simulating child restraint seat, known as a Static Force Application Device (SFAD) 58, was used to apply an operating load to the body 12. As shown in FIGS. 7 and 8, the SFAD 58 includes a pair of anchor bars 60 that engage and latch into the anchorage hooks 36 of the seating structure 34 that are provided for attachment of the anchor bars 44 of a child restraint seat 38, in the manner shown in FIG. 4. The SFAD 58 also includes a lower surface 61 that rests on the cushion 40 of the seats 54, 56, and a rear surface 63 that rests against the seat back of the seats 54, 56.

A tether strap 62 is attached to the top of the SFAD 58, routed over the seat back 42, and attached to the tether bar 48 (as shown in FIGS. 3, 4 and 8) on the back of the seating structure 34. A loading cable 64 is attached to a point X on the SFAD 58, for applying a static tension load on the SFAD 58.

As shown in FIGS. 5 and 6, the vehicle was tested with two SFAD's 58 attached to the seating structure 34, to simulate conditions under which two occupied child restraint seats 38 might be anchored to the seating structure 34 during a collision. In the test setup of FIG. 5, one SFAD 58 was installed in each of the two 40% seats 54. In the test setup of FIG. 6, one SFAD was installed in one of the 40% seats 54, and the second SFAD 58 was installed in the center 20% seat, and overlaps partly onto the other 40% seat 54. There is not enough width in the seating structure 34 of the exemplary embodiment to have three child restraint seats 38, or SFADs 58, installed abreast across the rear seat of the SUV, so this combination was not tested. Our invention is applicable, however to vehicles having provisions for anchoring three or more child restraint seats 38 abreast in one seating structure 34.

In accordance with the test procedures specified in FMVSS 213 and 225, a force of 500 Newtons (N) was initially applied to the cables 64 to compress the foam or other resilient materials in the seat cushions 40 and seat backs 42, and the position of point X with respect to a reference point on the vehicle was measured. The tension in the cables is then increased to 18000 N, which represents 20 percent more operating load than the operating load of 15000 N required by the test procedures of FMVSS 213 and 225, and the position of point X was measured a second time with respect to the same reference point on the vehicle. For the exemplary embodiment, the total change in position of point X was less that the 125 mm maximum deflection allowed under FMVSS 225 at an operating load of 15000 N, even when subjected to an operating load (18000 N) that was 20 percent above the 15000 N operating load prescribed by FMVSS 225.

In the test vehicle, the vertical dimension D2 of the gap 18 between the localized area 16 of the crossmember 22 and the upper surface 20 of the frame 14 was set at approximately 16 mm. It should be noted, however, that the width of the gap 18 used in the test vehicle was specifically selected on the basis of the overall design of the test vehicle, and the allowable deflection and predetermined load to be applied in view of the requirements of FMVSS 225. In other vehicles, or under different loading conditions, the gap 18 can, and in one example, will, have a different width.

As anticipated, the operating load caused the components of the seating structure 34 and body 12, including the crossmember 22 to initially deflect locally downward until the localized area 16 of the crossmember 22 came into contact with the upper surface 20 of the frame 14. Further loading toward the eventual full load of 18000 N caused little additional localized deflection, with the floor pan 30 and C-pillar crossmember 50 being pulled upward slightly after the localized area 16 of the body 12 contacted the frame 14. The majority of the operating load was reacted into the frame 14 through compression loading, without significant deflection, of the pedestal portions 26 of the crossmember 22.

The test results confirmed that a vehicle having a body-on-frame apparatus 10 according to our invention, can exceed the requirements of FMVSS 213 and 225, without the additional doublers and increasing the thickness of components required in prior vehicles. In fact, by designing the body 12 to have a localized area 16 that contacted the frame 14 at a predetermined load, according to our invention, the material thicknesses of the crossmember 22 and the C-pillar crossmember 50 of the test vehicle were reduced approximately 50 percent and 20 percent respectively, in comparison to what those thicknesses would have been if a load of 15000 N had to be reacted totally by localized bending of the components of the seating structure 34 and the body 12, according to the approach used in prior body-on-frame vehicles in which the body 12 was purposely designed to never contact the frame 14.

Those skilled in the art will readily recognize that, while the embodiments of our invention disclosed herein are presently considered to be preferred, various changes and modifications can be made without departing from the spirit and scope of the invention. For example, our invention may be used for limiting localized deflection of a vehicle body caused by operating loads generated structures for purposes other than passenger seating, including but not limited to cabinetry or fixtures in a recreational vehicle, equipment racks in an industrial van, or tie down provisions for wheel chairs. Our invention may also be practiced in trailers, in addition to motor vehicles.

The scope of the invention is indicated in the appended claims, and all changes or modifications within the meaning and range of equivalents are intended to be embraced therein.

We claim:

1. A body-on frame apparatus for a vehicle, the body-on-frame apparatus comprising:

a vehicle frame adapted for receiving a vehicle body;

a vehicle body mounted on the frame in a spaced relationship thereto and including a localized area that is downwardly deflectable when an operating load is applied to the localized area of the body; and a load bearing structure operatively attached to the localized area of the body for applying the operating load to the localized area;

the localized area of the body forming a localized substantially vertical gap between the frame and the localized area of the body, when the body is mounted on the frame in a spaced relationship thereto, that closes and allows the localized area of the body to contact the vehicle frame for resisting further localized deflection of the localized area of the body when the operating load is applied to the localized area of the body; and wherein the load bearing structure includes a passenger seating structure, and the operating load is applied to the seating structure.

2. The body-on-frame apparatus of claim 1, wherein the seating structure includes anchorages for a child restraint apparatus, and the operating load is applied to the seating structure by a load applying structure attached to the anchorages for the child restraint apparatus.

3. A body-on-frame apparatus for a vehicle, the body-on-frame apparatus comprising:

a vehicle frame adapted for receiving a vehicle body;

a vehicle body mounted on the frame in a spaced relationship thereto and including a localized area that is downwardly deflectable when an operating load is applied to the localized area of the body; and a load bearing structure operatively attached to the localized area of the body for applying the operating load to the localized area;

the localized area of the body forming a localized substantially vertical gap between the frame and the localized area of the body, when the body is mounted on the frame in a spaced relationship thereto, that closes and allows the localized area of the body to contact the vehicle frame for resisting further localized deflection of the localized area of the body when the operating load is applied to the localized area of the body; and wherein the frame includes an upper surface thereof adapted for contact by the localized area of the body, the body includes a lower surface thereof defining the localized area of the body, and wherein the body includes a crossmember defining the lower surface and localized area of the body.

4. The body-on-frame apparatus of claim 3, wherein the load bearing structure includes a passenger seating structure, and the operating load is applied to the seating structure.

5. The body-on-frame apparatus of claim 4, wherein the seating structure includes anchorages for a child restraint apparatus, and the operating load is applied to the seating structure by a load applying structure attached to the anchorages for the child restraint apparatus.

6. A vehicle body apparatus adapted for attachment to a vehicle frame in a spaced relationship thereto, the vehicle body apparatus comprising:

a vehicle body including a localized area that is substantially vertically deflectable by operating load applied to the localized area when the body is attached to the frame in a spaced relationship thereto; and a load bearing structure operatively attached to the localized area of the body for applying the operating load to the localized area;

the localized area of the body forming a localized substantially vertical gap between the frame and the localized area of the body, when the body is mounted on the frame in a spaced relationship thereto, that closes and allows the localized area of the body to contact the frame for resisting further localized downward deflection of the localized area of the body when the operating load is applied to the localized area of the body; and wherein the load bearing structure includes a passenger seating structure, and the operating load is applied to the seating structure.

7. The vehicle body apparatus of claim 6, wherein the seating structure includes anchorages for a child restraint apparatus, and the operating load is applied to the seating structure by a load applying structure attached to the anchorages for the child restraint apparatus.

8. A vehicle body apparatus adapted for attachment to a vehicle frame in a spaced relationship thereto, the vehicle body apparatus comprising:

a vehicle body including a localized area that is substantially vertically deflectable by an operating load applied to the localized area when the body is attached to the frame in a spaced relationship thereto; and a load bearing structure operatively attached to the localized area of the body for applying the operating load to the localized area;

the localized area of the body forming a localized substantially vertical gap between the frame and the localized area of the body, when the body is mounted on the frame in a spaced relationship thereto, that closes and allows the localized area of the body to contact the frame for resisting further localized downward deflection of the localized area of the body when the operating load is applied to the localized are of the body;

wherein the frame includes an upper surface thereof adapted for contact by the localized area of the body and the body includes a lower surface thereof defining the localized area of the body; and wherein the body includes a crossmember defining the lower surface and localized area of the body.

9. The vehicle body apparatus of claim 8, wherein the load bearing structure includes a passenger seating structure, and the operating load is applied to the seating structure.

10. The vehicle body apparatus of claim 9, wherein the seating structure includes anchorages for a child restraint apparatus, and the operating load is applied to the seating structure by a load applying structure attached to the anchorages for the child restraint apparatus.

* * * * *